United States Patent Office 3,040,009
Patented June 19, 1962

3,040,009
PROCESS FOR THE HYDROGENATION OF HYDROCARBON RESINS WITH METALLIC NICKEL
Francis T. Wadsworth, Dickinson, and Joseph R. Kenton, Texas City, Tex., assignors, by mesne assignments, to Standard Oil Company, Chicago, Ill., a corporation of Indiana
No Drawing. Filed May 3, 1956, Ser. No. 582,322
2 Claims. (Cl. 260—82)

Our invention relates to the hydrogenation of a synthetic hydrocarbon resin of petroleum origin with the object of improving its resistance to auto-oxidation. More particularly, the resin may be characterized as an aromatics rich, thermo-plastic resin having a high degree of olefinic unsaturation, of the type derived by polymerization of cracked naphtha fractions which are rich in diolefins. Such resins have value in the manufacture of floor tile and a wide range of protective coverings as a replacement for more expensive synthetic plastics such as polystyrene, for example. The value of petroleum derived synthetic resins, however, is limited by their tendency to gradual discoloration on aging, apparently through auto-oxidation of unsaturated compounds and/or oxidizable groups in the molecular structures making up the resins.

We have investigated experimentally the feasibility of catalytic hydrogenation as a means for stabilizing such resins against discoloration on aging. We have discovered that hydrogenation catalysts comprising nickel on a porous solid support such as a clay or alumina gel has special advantages in hydrogenating the synthetic thermoplastic resins of petroleum origin. Compared to the use of platinum containing hydrogenation catalysts, for example, the nickel containing hydrogenation catalysts show significant advantages in color improvement and reduction in iodine value. The latter property may be correlated with stability against discoloration on aging. The nickel containing catalysts are effective at unusually low pressure, significant improvement in color and reduction in iodine value being attained at operating pressures as low as 200 p.s.i.g. On the other hand, a surprising advantage in operating effectiveness is obtained by the use of a pressure in the region of about 500 p.s.i.g. Thus, we have found that catalyst life is more than tripled by operation at 500 p.s.i.g., with substantially superior product quality over the range of useful activity, in comparison to operation at 200 p.s.i.g. or even at about 400 p.s.i.g. Since catalyst cost is a major element in the operating economies of hydrogenation processes, operation at about 500 to 750 p.s.i.g. provides significant advantage. Although pressures higher than 500 p.s.i.g. can be used, there is no need to exceed the range of about 500 to 1000 p.s.i.g. range so that the high cost associated with such high pressure operation can be avoided.

In the practice of the invention, the resin feed is charged to a reactor containing a body of the nickel containing hydrogenation catalyst. For ease in handling, the resin advantageously is dissolved in a solvent such as xylene, toluene or ordinary mineral spirits. The charge may be contacted co-currently or countercurrently with hydrogen, which may be derived from any convenient source including hydroformer make gas. An elevated temperature accelerating the reaction rate, about 250 to about 750° F. but preferably about 400 to 500° F., is employed. The degree of improvement in color and iodine number can be controlled conveniently by adjusting the space velocity. In general, space velocities up to about 3 or 4 give satisfactory improvement in color and iodine number although a space velocity of about 1–2 volumes of charge per volume of catalyst is preferred.

The catalyst is a supported nickel hydrogenation type catalyst. For example, the catalyst may comprise about 65% of reduced metallic nickel on a Kieselguhr or alumina gel support. The proportion of nickel can be varied widely, and other supports such as the natural clays, silica gel, activated carbon and the like are suitable. The reaction mixture is passed into a gas separator for separation and recovery of unreacted hydrogen. The hydrogenated resin then may be separated from the solvent by distillation and gas stripping. The recovered solvent and hydrogen advantageously are recycled.

The charge resin of the invention may comprise a thermoplastic polymerization product of a highly olefinic heavy naphtha fraction of the type produced by high temperature pyrolysis of petroleum fractions, advantageously light gaseous fractions, but including naphthas and gas oils. For example, the process may employ, as the initial charging stock, a selected fraction of a specialty naphtha commonly known in the art as dripolene. Specifically when the term "dripolene" is used, hereinafter, it means the normally liquid mixture of hydrocarbons obtained by high temperature pyrolysis of hydrocarbon gases. The pyrolysis is carried out at a temperature between about 1200° and 1800° F. and a short contact time between about 0.05 and 5 seconds. The charge may be, for example, ethane, methane, propane, propylene, or mixtures thereof such as a by-product refinery gas as obtained by cracking heavy petroleum oils in gasoline manufacture. The gas feed is preheated and passed through the alloy tubes of a cracking furnace at high velocity and at a temperature between about 1200° and 1800° F., preferably about 1350° and 1550° F. Low pressures up to about 100 p.s.i.a. are ordinarily used, a pressure below about 35 p.s.i.a. being satisfactory.

The pyrolysis products include normally gaseous products containing unsaturated hydrocarbon such as ethylene, normally liquid hydrocarbons rich in unsaturated hydrocarbons such as olefins and diolefins of varying boiling points and structural configuration, and various aromatic hydrocarbons, as well as tar. Although the pyrolysis conditions can be modified to favor production of gaseous or liquid products, ethylene is usually the desired product and liquid hydrocarbons and tar are considered low-value by-products. The pyrolysis mixture is rapidly cooled, usually by quenching with water to a temperature of about 400° F., and the viscous tarry material condensed out. The uncondensed vapors from the quenching operation are compressed and cooled to condense a liquid fraction, dripolene, which boils between about 100° and 400° F. The amount of tar and dripolene produced is dependent upon the feed, temperature, contact time and pressure, but ordinarily the liquid products represent about 3% by weight of the total quantity of gas charged to the pyrolysis reactor.

Dripolene has not been completely analyzed because of its complexity but a typical specimen may be characterized as follows.

ASTM distillation range, ° F.:
| | |
|---|---|
| Initial | 100 |
| 10% | 146 |
| 20% | 162 |
| 30% | 178 |
| 40% | 188 |
| 50% | 196 |
| 60% | 206 |
| 70% | 234 |
| 80% | 296 |
| 90% | 340 |
| Final | 360 |
| Gravity, ° API at 60° F | 34.7 |
| Bromine number, cg. $Br_2$/g | 104.1 |
| Maleic anhydride value, mg. M.A./g | 79 |
| Index of refraction, $n^{25}D$ | 1.4830 |

Typically, it may contain the following compounds in the amounts specified.

Analysis, volume-percent:

| | |
|---|---|
| Propane and propylene | 0.7 |
| Isobutane | 0.1 |
| Isobutylene | 0.8 |
| 1-butene | 0.5 |
| 2-butene | 0.6 |
| n-Butane | 0.4 |
| Butadiene | 3.9 |
| Pentadienes | 7.7 |
| Pentylenes | 6.3 |
| Other $C_5$ | 0.4 |
| Benzene | 34.2 |
| Toluene | 7.8 |
| Xylenes | 1 |
| Styrene | 3 |
| Dicyclopentadiene | 5 |
| Other | 29.6 |

The process of the invention uses a fraction of dripolene which boils within the range of about 200° to 400° F., preferably about 230° to 375° F. Using a dripolene fraction which is substantially lower boiling, it is not possible to produce a resin which provides a mastic tile with satisfactory resistance to indentation. It is not essential however that the entire fraction boil within the specified range of about 200° to 400° F. A small portion, e.g., as much as 15% or so, may boil below 200° F. and/or above 400° F.

The charge can be prepared by fractionally distilling the total dripolene and rejecting about 70 to 90% of a distillate fraction overhead. The bottoms fraction approximating 10 to 30% of the dripolene is recovered as the charge to the resin forming operation. Lighter color resins are produced by redistilling the bottoms fraction. A distillate fraction comprising about 50 to 90%, preferably about 80%, then is taken overhead and is subjected to thermal polymerization. Tests on a typical distillate charge follow.

ASTM distillation range, ° F.:

| | |
|---|---|
| Initial | 178 |
| 5% | 193 |
| 10% | 205 |
| 20% | 229 |
| 30% | 244 |
| 40% | 283 |
| 50% | 309 |
| 60% | 335 |
| 70% | 349 |
| 80% | 355 |
| 90% | 392 |
| 95% | 423 |
| Final | 451 |
| Gravity, ° API at 60° F | 27.9 |
| Bromine number, cg. $Br_2/g$ | 96 |
| Maleic anhydride value, mg. M.A./g | 49 |
| Viscosity, SSU at 100° F | 30 |
| Color, Gardner | 5 |

Typically, the charge stock may have a bromine number between about 90 and 120 and a maleic anhydride value between about 20 and 50.

The charge is thermally polymerized at a temperature of about 400° F. to 500° F. to produce a thermo-plastic resin. The thermal polymerization is preferably conducted at a temperature between about 440° and 480° F. for a period of about 5 to 50 hours; the higher the reaction temperature employed, the shorter is the reaction time used. For example, if a temperature of about 485° F. is used, the reaction time may be about 4 to 16 hours. If a temperature of about 450° F. is used, then a reaction time of about 16 to 36 hours should be employed. A temperature of about 470° F. and a polymerization time of about 16 hours are highly satisfactory. Approximately 40 to 60% of the charging stock is converted to a thermo-plastic resin. A polymerization temperature higher than about 500° F. should not be used since the resulting resin will be black in color. By thermally polymerizing within the specified temperature limits, a resin of 2 to 3 Barrett color (about 10 to 14 Gardner color) having an iodine number of 140 to 200 can be produced.

Using a charge resin of the above type, the operation of the invention may be illustrated by the following operation example. The process equipment included a charge reservoir, a Hills-McCanna charge pump, two preheaters, a 1040 cc. reactor and a water cooled gas separator. A 50% solution of the charge resin in 300° to 400° F. mineral spirits solvent was preheated and pumped up-flow through the reactor at the rate of 2.4 liters/hour. The hydrogen flow was regulated so that the total exit gas rate was 4 liters/minute. The reactor temperature was maintained at about 430° F. at a pressure of 500 p.s.i.g. The catalyst used was 1220 grams of Harshaw Ni 0104 catalyst. This is a commercially available catalyst which comprises 67% nickel on an alumina gel support. The nickel after reduction and stabilization is 65% reduced. The catalyst was used in the form of ⅛ inch tablets.

The charge resin had an iodine number of 153 and a Gardner color of 11. The initially hydrogenated resin had an iodine number of 9 which rose gradually to 71 after 250 hours on-stream. The Gardner color of the product was initially 2+ which increased to about 12+ by the end of the run. A composite sample from the long run had an iodine number of 58 and a Gardner color of 11. The catalyst was still active. By contrast, when operating under comparable conditions but at 200 p.s.i.g. pressure, the initial iodine number was about 66, with a Gardner color of 6½. These values increased to 94 and 10+ respectively after only 72 hours operation. In a run at 380 p.s.i.g. of hydrogen under similar conditions, the initial iodine number was about 35, with the Gardner color about 7½, which increased to 85 and 14 respectively after 95 hours on-stream. Similar runs with a catalyst comprising 0.6% platinum-on-alumina gel gave unsatisfactory results. Other known hydrogenation catalysts, e.g., chromia or molybdenum oxide types, require higher temperatures and result in unsatisfactory color. When the data for long runs are plotted to determine nature of the change in iodine number for the product with time on-stream, it is seen that the low-pressure curves with both the nickel and platinum catalysts indicate a steady deterioration in hydrogenating activity, at an uneconomic decline rate. By contrast, at about 500 p.s.i.g., the curve remained virtually flat, after an initial rise in iodine number from 10 to about 45 in 50 hours. The curve leveled off and the rise in iodine number was only about 25 over the next 200 hours of operation.

We claim:

1. A process for manufacturing a thermally polymerized resin, which process comprises pyrolyzing normally gaseous hydrocarbons at temperatures in the range of about 1200–1800° F. and pressures between about atmospheric and 100 p.s.i.a., separating by distillation of the pyrolysis products a distillate fraction boiling within the range of about 200–400° F. at atmospheric pressure, thermally polymerizing in the absence of intermediate heat soaking said fraction at temperatures in the range of about 400–500° F. for a period of about 5 to 50 hours, whereby there is obtained an aromatics-rich highly unsaturated thermoplastic resin, contacting in the liquid phase said resin dissolved in a hydrocarbon solvent boiling in the naphtha boiling range at temperatures in the range of about 250–750° F. pressures in the range of about 500–1000 p.s.i.g. and at volumetric space velocities in the range of about 1 to 4 with hydrogen and a hydrogenation catalyst comprising essentially metallic nickel distributed on a solid porous support, and separating the hydrogenated resin from said solvent, said hydrogenated resin being characterized by having improved color and stability against discoloration upon aging.

2. A process for manufacturing a thermally polymerized resin, which process comprises pyrolyzing normally gaseous hydrocarbons at temperatures in the range of about 1200–1800° F. and pressures between about atmospheric and 100 p.s.i.a., separating by distillation of the pyrolysis products a distillate fraction boiling within the range of about 200–400° F. at atmospheric pressure, thermally polymerizing said fraction at temperatures in the range of about 400–500° F. for a period of about 5 to 50 hours, whereby there is obtained an aromatics-rich highly unsaturated thermoplastic resin, contacting in the liquid phase said resin dissolved in a hydrocarbon solvent boiling in the naphtha boiling range at temperatures in the range of about 250–750° F., pressures in the range of about 500–1000 p.s.i.g. and at volumetric space velocities in the range of about 1 to 4 with hydrogen and a hydrogenation catalyst comprising essentially metallic nickel distributed on a solid porous support, and separating the hydrogenated resin from said solvent, said hydrogenated resin being characterized by having improved color and stability against discoloration upon aging.

References Cited in the file of this patent

UNITED STATES PATENTS

| | | |
|---|---|---|
| 2,046,160 | Graves | June 30, 1936 |
| 2,046,257 | Flint | June 30, 1936 |
| 2,062,845 | Thomas et al. | Dec. 1, 1936 |
| 2,303,118 | Frey | Nov. 24, 1942 |
| 2,497,176 | Mason | Feb. 14, 1950 |
| 2,739,961 | De Ridder et al. | Mar. 27, 1956 |
| 2,824,860 | Aldridge et al. | Feb. 25, 1958 |
| 2,836,581 | Gordon | May 27, 1958 |
| 2,911,395 | Small | Nov. 3, 1959 |